(12) United States Patent
Luo et al.

(10) Patent No.: US 7,618,600 B1
(45) Date of Patent: Nov. 17, 2009

(54) REACTOR FOR REMOVING AMMONIA

(75) Inventors: Weifang Luo, Livermore, CA (US); Kenneth D. Stewart, Valley Springs, CA (US)

(73) Assignee: Sandia Corporation, Livermore, CA (US)

( * ) Notice: Subject to any disclaimer, the term of this patent is extended or adjusted under 35 U.S.C. 154(b) by 274 days.

(21) Appl. No.: 11/487,527

(22) Filed: Jul. 13, 2006

(51) Int. Cl.
*B01J 8/02* (2006.01)
*B01J 35/02* (2006.01)
*B01D 59/26* (2006.01)

(52) U.S. Cl. .......................... 422/211; 96/108
(58) Field of Classification Search ................ 422/211; 96/108
See application file for complete search history.

(56) References Cited

U.S. PATENT DOCUMENTS

| | | | |
|---|---|---|---|
| 4,341,651 A * | 7/1982 | Beckert et al. | 252/188.25 |
| 5,895,519 A * | 4/1999 | Lorimer | 95/56 |
| 6,168,645 B1 * | 1/2001 | Succi et al. | 95/8 |
| 6,190,629 B1 | 2/2001 | Solomon et al. | 423/238 |
| 6,261,528 B1 * | 7/2001 | Carrea et al. | 423/230 |
| 6,274,093 B1 * | 8/2001 | Long et al. | 422/129 |
| 6,376,114 B1 | 4/2002 | Bonville, Jr. et al. | 429/19 |
| 6,428,612 B1 * | 8/2002 | McPhilmy et al. | 96/132 |
| 6,514,430 B1 * | 2/2003 | Corazza et al. | 252/181.1 |
| 6,645,271 B2 | 11/2003 | Seguin et al. | 95/90 |
| 6,776,970 B1 | 8/2004 | Vergani et al. | 422/177 |
| 2003/0038082 A1 * | 2/2003 | Vergani et al. | 210/656 |
| 2003/0068264 A1 * | 4/2003 | Schmidt et al. | 423/237 |

OTHER PUBLICATIONS

Luo, W.; "($LiNH_2$—$MgH_2$): a viable hydrogen storage system," *Journal of Alloys and Compounds*, v.381, 2004: pp. 284-287.
Hu, Y.H.; Ruckenstien, E.; "$H_2$ Storage in $Li_3N$. Temperature-Programmed Hydrogenation and Dehydrogenation," *Industrial and Engineering Chemistry Research*, v.42, 2003: pp. 5135-5139.
Hu, Y.H.; Ruckenstien, E.; "Ultrfast Reaction between LiH and $NH_3$ during $H_2$ Storage In $Li_3N$," *Journal of Physical Chemistry A*, v.107(46), 2003: pp. 9737-9739.
Hu, YH.; Ruckenstien, E.; "$H_2$ Storage in $Li_3N$. Temperature-Programmed Hydrogenation and Dehydrogenation," *Industrial and Engineering Chemistry Research*, v.42, 2003: pp. 5135-5139.
Hu, YH.; Ruckenstien, E.; "Ultrafast Reaction between LiH and $NH_3$ during $H_2$ Storage In $Li_3N$," *Journal of Physical Chemstry A*, v.107(46), 2003: pp. 9737-9739.
Luo, W; Sickafoose, S.; "Thermodynamic and structrual characterization of the Mg-Li-N-H hydrogen storage system," *Journal of Alloys and Compounds*,v.407, 2006: pp. 274-281.

* cited by examiner

*Primary Examiner*—Walter D Griffin
*Assistant Examiner*—Natasha Young
(74) *Attorney, Agent, or Firm*—Timothy P. Evans

(57) ABSTRACT

Disclosed is a device for removing trace amounts of ammonia from a stream of gas, particularly hydrogen gas, prepared by a reformation apparatus. The apparatus is used to prevent PEM "poisoning" in a fuel cell receiving the incoming hydrogen stream.

9 Claims, 4 Drawing Sheets

REACTOR FOR REMOVING AMMONIA

STATEMENT OF GOVERNMENT INTEREST

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

CROSS REFERENCE TO RELATED APPLICATIONS

None

BACKGROUND

Embodiments of the present invention generally relate to a method and device for treating a source of hydrogen gas, such as from a reformer, in order to remove potentially deleterious contaminating species, particularly ammonia, which may be co-formed during the reformation process or inadvertently introduced by contaminated feedstocks.

Disclosed is a process for removing small amounts of ammonia from a hydrogen gas stream.

The growth in the world's energy needs brought about by population growth has place a severe strain on the increasing declining stocks of proven reserves of traditional energy resources such as coal petroleum and natural gas. Moreover, geo-political issues such as global warming, said to be the result of fossil fuel combustion in the developed world as well as a drive toward energy independence in this country, are themselves driving an increasing emphasis on the use of environmentally friendly energy sources. Sources such as solar, wind, and geothermal are beginning to replace other energy sources to produce is electricity. However, an alternative to the use of gasoline or similar hydrocarbons to fuel personal automobiles remains elusive.

The conversion of liquid hydrocarbon fuel into hydrogen and carbon dioxide to feed polymer electrolyte membrane (PEM) fuel cells in a compact and energy efficient unit has numerous potential applications. Several examples of these applications include the replacement of batteries in remote sensors, laptop computers, and automobiles, wherein power demands can range from several milliwatts to hundreds of kilowatts. Research groups developing mini- and micro-reforming prototypes are considering a number of approaches. Most approaches have focused on designing miniaturized hydrogen plants that involve a number of individual unit operations (see Pettersson, et al., *International Journal of Hydrogen Energy*, 2001; 26: p. 243-264; Joensen, et al., *Journal of Power Sources*, 2002; 105: p. 195-201; de Wild, et al., *Catalysis Today*, 2000; 60: p. 3-10; and Amphlett, et al., *International Journal of Hydrogen Energy*, 1996; 21: p. 673-678). Two examples of known processes for producing an optimized hydrogen stream are: 1) partial oxidation at 800-1100° C. and ambient pressure, or 2) direct catalytic steam reforming over $Cu/Zn/Al_2O_3$ based catalysts at 250° C. and pressure in the range of 0.1-3.5 MPa. Experiments on $Cu/Zn/Al_2O_3$ catalysts have established that the direct steam reforming of methanol in a high steam environment can be rapid, and under certain conditions can lead to a favorable product yield with negligible methane formation (Peppley, et al., *Applied Catalysis A*, 1999; 79: p. 21-29; Agrell, et al., *Journal of Power Sources*, 2002; 106: p. 249-257).

Fuel cells are well-known and commonly used to produce electricity by an oxidation/reducing ("redox") reaction to power electrical apparatus such as apparatus on-board space vehicles. In such fuel cells, a plurality of planar fuel cells are typically arranged in a stack surrounded by an electrically insulating frame structure that defines manifolds for directing flow of reducing, oxidant, coolant and product fluids. Each individual cell generally includes an anode electrode and a cathode electrode separated by an electrolyte. A reactant or reducing fluid such as hydrogen is supplied to the anode electrode, and an oxidant such as oxygen or air is supplied to the cathode electrode. In a cell utilizing a proton exchange membrane ("PEM") as the electrolyte, the hydrogen electrochemically reacts at a surface of the anode electrode to produce protons and electrons. The electrons are conducted to an external load circuit and then returned to the cathode electrode, while the protons transfer through the electrolyte to the cathode electrode, where they react with the oxidant and electrons to produce water and release thermal energy.

Additionally, it is known that some fuel cells operate on pure hydrogen gas, while others utilize a reformate fuel wherein a hydrogen enriched reducing fluid is formed from any of a variety of hydrocarbon fuels by fuel processing components including, for example, use of known autothermal, steam or partial oxidation reformers. Unfortunately, such reformation of hydrocarbon fuels generates ammonia that moves with the reformate fuel gas reactant stream into the fuel cell where the ammonia dissolves in the water in the electrolyte to become ammonium ions. The ammonia is formed in the reformer by a reaction between hydrogen and nitrogen present in the air that is used in the reforming process or nitrogen added to a peak shaved natural gas. The ammonium ions are then adsorbed by the PEM electrolyte to displace protons within the PEM, thereby decreasing conductivity of the PEM, and hence having a significant negative effect on performance of the fuel cell. Depending upon the temperature of the reformer, composition of any catalyst in the reformer, and nitrogen concentration within the reformer, ammonia formed in the reforming process may range from 1-100 parts-per-million ("ppm"). To efficiently operate a fuel cell power plant on such reformate fuel, the ammonia must be effectively removed from the fuel prior to entry of the fuel into the fuel cells of the plant.

Accordingly, there is a need to develop a fuel treatment system for removing ammonia from hydrogen generating reactors including reformate-produced fuels.

SUMMARY OF THE INVENTION

Accordingly, it is an object of the embodiments disclosed herein to provide an improved system for removing ammonia from a hydrogen fuel stream.

It is another object to provide a device through which a hydrogen fuel stream is passed which will chemically react with ammonia.

It is yet another object to provide a device for reducing ammonia contamination in a reformate fuel to an acceptable level on a continuous basis.

Still another object is to provide a process to be applied to a source of hydrogen feedstock to reduce ammonia contamination to an acceptably low level for use in a fuel cell.

These and other objects and advantages of the ammonia reduction system will become more readily apparent when the following description is read in conjunction with the accompanying drawings.

DETAILED DESCRIPTION OF EMBODIMENTS OF THE INVENTION

Figure 1:
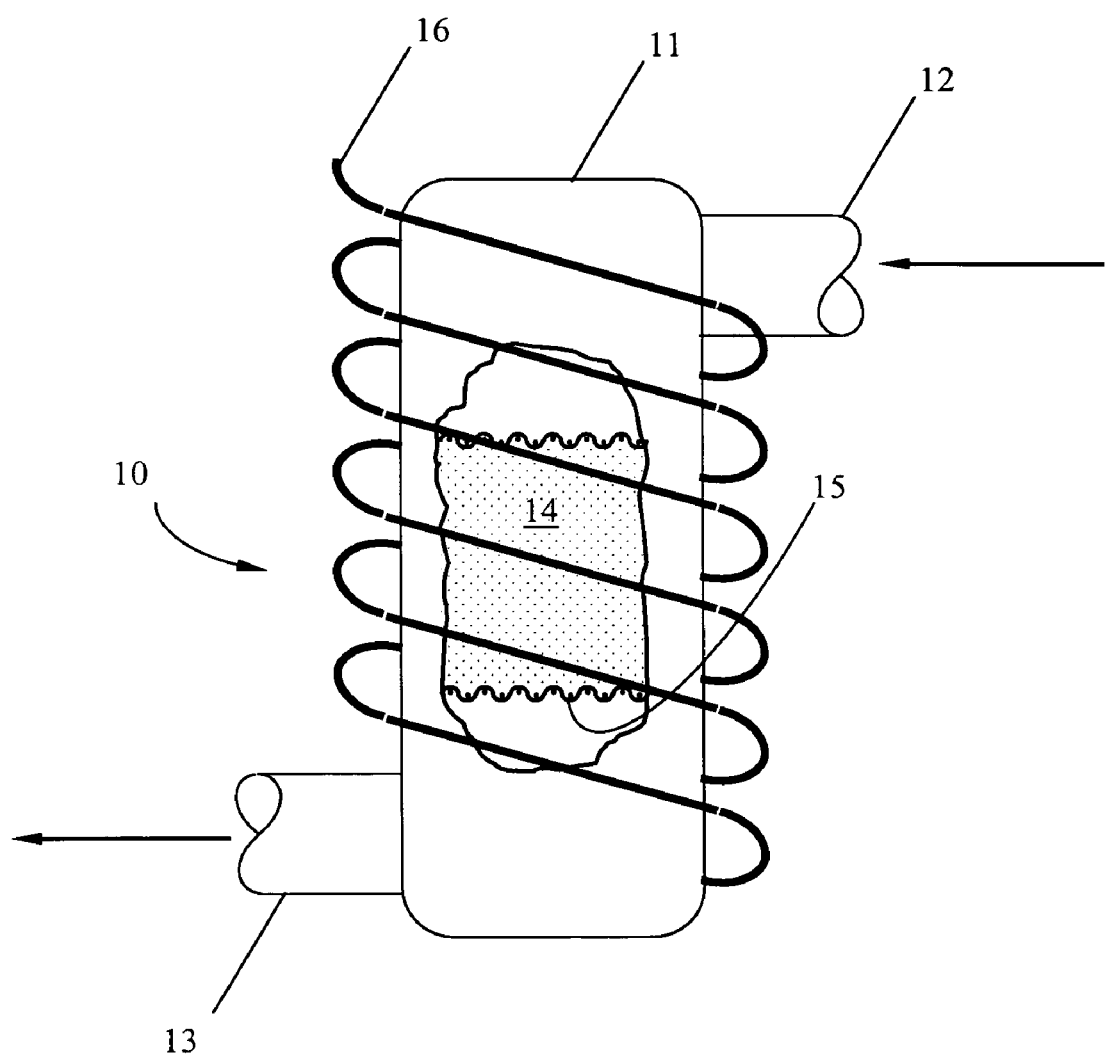
FIG. 1 illustrates a cut-away diagram of a simplified gas reactor for removing ammonia from a gas stream passing through the reactor and contacting it with a reaction material capable of rapidly combining with ammonia.

With reference to the accompanying figures, a gas purification apparatus of an embodiment of this invention comprises a getter media for removing trace amounts of ammonia from hydrogen gas generally contained within a gas purification chamber that is in fluid communication with both a gas inlet and a gas outlet. Many configurations of such an apparatus will be known to those with skill in the art of gas purification. One example of a first embodiment of a present invention device could be deployed as is illustrated in FIG. 1. The gas purification device illustrated at 10 and could comprise this or any suitable alternative configuration. The present device would be comprised of gas inlet 12 and gas outlet 13 on opposite ends of container 11 made of any number of materials, but typically a hydrogen resistant stainless steel such as AISI 316L or 321L austenitic steel. Gas inlet 12 and gas outlet 13 are provided with standard connections (not shown) known to those of skill in the gas purification arts for connection to gas lines leading to and away from gas purification device 10. A getter media 14 would be contained inside container 11 and held in place by a porous mechanical barrier 15, in this case a wire mesh, in a central zone within container 11. Lastly, the gas purification device 10 would include a means for heating getter media 14 in order to improve the kinetics of the process. The present embodiment is shown with a spiral-wound heat tape 16 surrounding the zone containing getter media 14 and is used for maintaining the temperature of the contained getter media between about room temperature (~25° C.) to about 300° C.

Figure 2A:
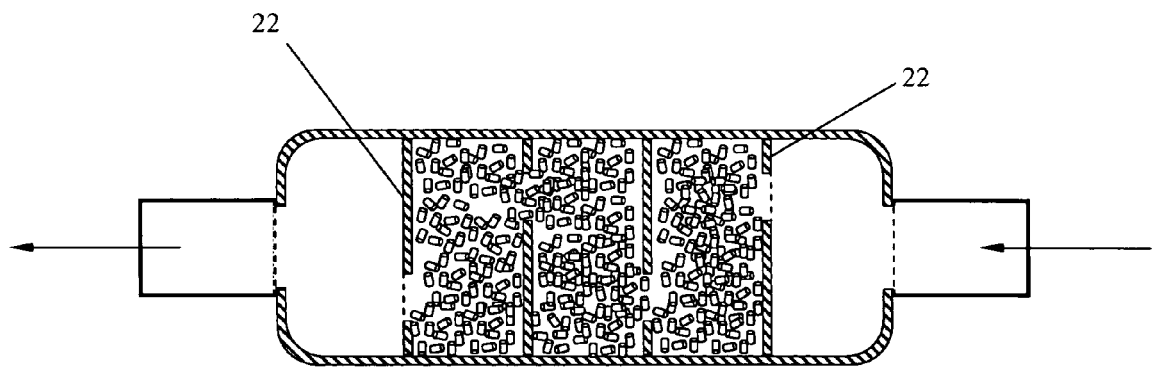
FIG. 2A illustrates a cross-section of a simplified gas reactor containing a reaction material compressed into a plurality of cylindrical pellets.
Figure 2B:
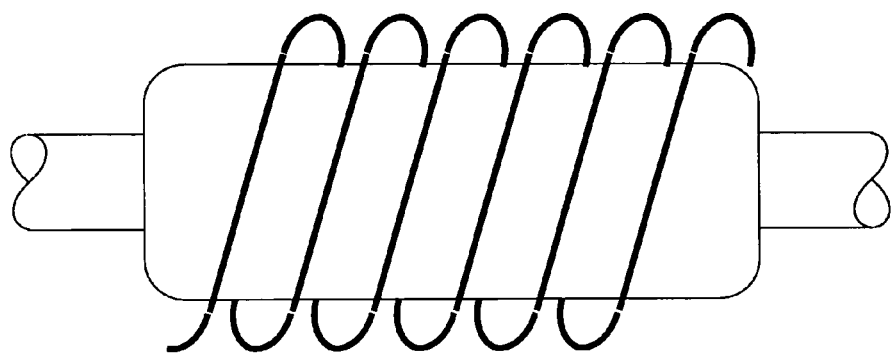
FIG. 2B illustrates an exterior view of the gas reactor of FIG. 2A showing the placement of a spirally-wound heating means covering the central portion of the reactor.

In one embodiment, getter media 14 could comprise a loosely packed powder. In another embodiment getter media 14 could be compressed into a plurality of small pellets 22 as shown in FIG. 2. It is noted, however, that although a cylindrical geometry is shown to comprise the pellets, any effective pellet geometry would find equal utility. However, due to the reduced surface area available for reacting with the transiting gas, the size of the pellets would need to be small and the pellets packed tightly together. Moreover, the interior of container 11 should be broken up by a series of baffles 22 to increase the path length over which the gas traverses through device 10.

Figure 3:
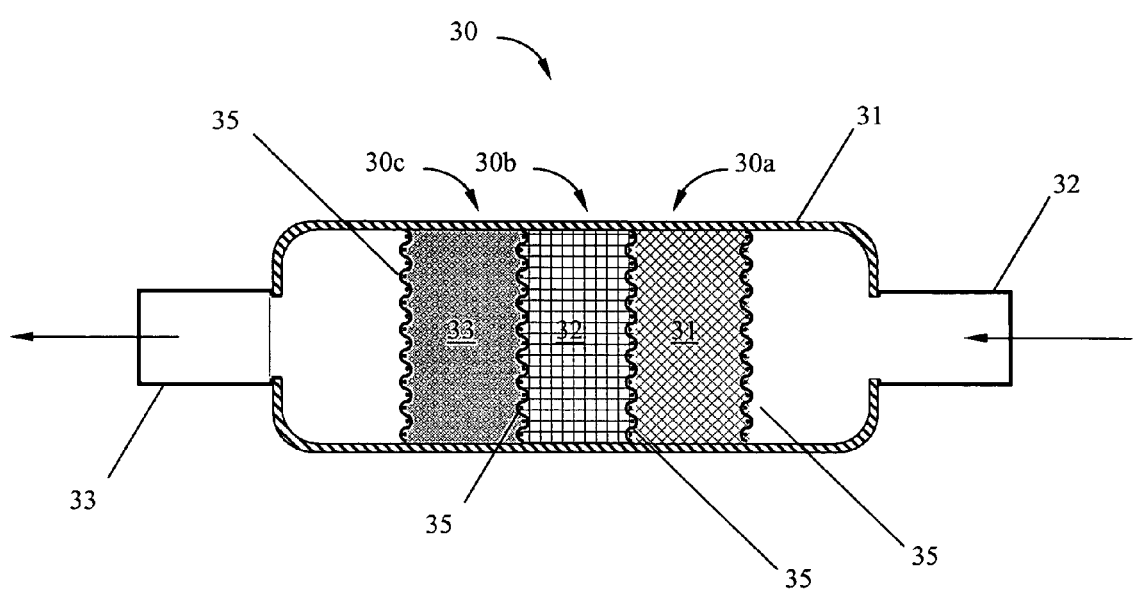
FIG. 3 illustrates a cut-away diagram of a simplified reactor containing a first gas reaction zone for drying the incoming gas and a second separate zone for removing trace quantities of ammonia from a gas stream passing through the reactor.

Finally, for some applications, it may be necessary to provide multiple zones containing the same or different gettering materials to remove larger amounts of ammonia. For this application, modified ammonia reactor 30 such as is illustrated in cross-section at FIG. 3, is provided. Here hydrogen gas, indicated by an arrow entering through inlet 32 comes into contact with a first gettering material 31 contained in zone 30$a$, a second gettering material 32 contained in zone 30$b$, and finally a third getter material 33 contained in zone 30$c$. As before, device 30 is comprised of a container 31, gas inlet 32 and outlet 33, and gas permeable mechanical barriers 35, shown as a wire screen or gauze, for physically separating the getter materials such that each is contained within one of three separate but connected zones. Note that while three zones are shown it is not known how many would be optimal. Moreover, the length and number of zones used is likely dictated by the restriction to flow placed on the gas stream by getter material itself.

The compounds used as the gettering media for the above embodiments can comprise any material or group of materials having a physical or chemical affinity for ammonia. In particular, the preferred ammonia gettering material, especially for small or trace quantities of ammonia, is lithium hydride (LiH) as this material is known to react very rapidly with ammonia to form lithium amide ($LiNH_2$) and free hydrogen (see, for instance Hu, Y H, et al., "Ultrafast Reaction between LiH and $HN_3$ during $H_2$ Storage in $Li_3N$," *The Journal of Physical Chemistry A*, 2003; vol. 107(46): pp. 9737-9739) herein incorporated by reference. In another embodiment, various chlorides, sulfates or nitrates of transition metals may be used to getter somewhat larger quantities of ammonia since these species are known to be acidic and, therefore, should react with ammonia, a basic species. In particular, transition metals are known to form strong acids and dissociate to nearly 100% in presence of water. Furthermore, the hydroxides of transition metals are weak bases. The salts of transition metals, therefore, e.g., the nitrate/sulfate/chloride of transition metals, are generally acidic and because ammonia is basic it will readily react with these acidic salts.

An example of a transition metal nitrate is cobalt nitrate obtained from Sigma Aldrich (Milwaukee, Wis.) as the hexahydrate Co $(NO_3)_2.6H_2O$. To demonstrate the efficacy of the approach an experiment was performed in which hydrogen gas was desorbed from a lithium amide/imide/hydride storage bed and passed through powdered cobalt nitrate. Prior to exposure to cobalt nitrate the ammonia level in the stream of desorbed hydrogen was measured to be about 200 ppm using a Draeger-Tube ammonia gas detector tube (available from Draeger Safety Inc., Pittsburgh, Pa.) which exhibits a color change as the detection material within the tube is exposed to a contaminating species such as ammonia. Because the detection test is irreversible and cumulative, the sensitivity of the test is increased by pumping multiple tube volumes through the detection material. In the present test, after the contaminated gas stream passed through the powdered nitrate no color change could be detected even after pumping 10 tube volumes through the most sensitive of the Draeger ammonia detector tubes, i.e., 0-3 ppm. It is estimated, therefore, that ammonia levels in the gas stream after passing through the powdered nitrate were less than 1 ppm.

In still another embodiment, finely powdered carbon may be used to physically absorb ammonia due to the very high surface areas available with this form of carbon. Ammonia is a polar molecule and easily attaches to many solid surfaces. Experiments similar to those conducted with cobalt nitrate were also conducted with powdered graphite obtained as natural graphite with 85-98% carbon from Asbury Graphite Mill Inc (Asbury, N.J.). As before, the ammonia level in the stream of desorbed hydrogen was measured to be about 200 ppm using a Draeger-Tube ammonia gas detector tube. Again, after passing through the powdered graphite, the ammonia level could not be detected when using the most sensitive of the ammonia gas detector tube. Because the mechanism for ammonia removal by carbon is physical adsorption, other forms of carbon besides graphite, e.g., carbon black and activated carbon, are thought to be equally effective.

Figure 4:
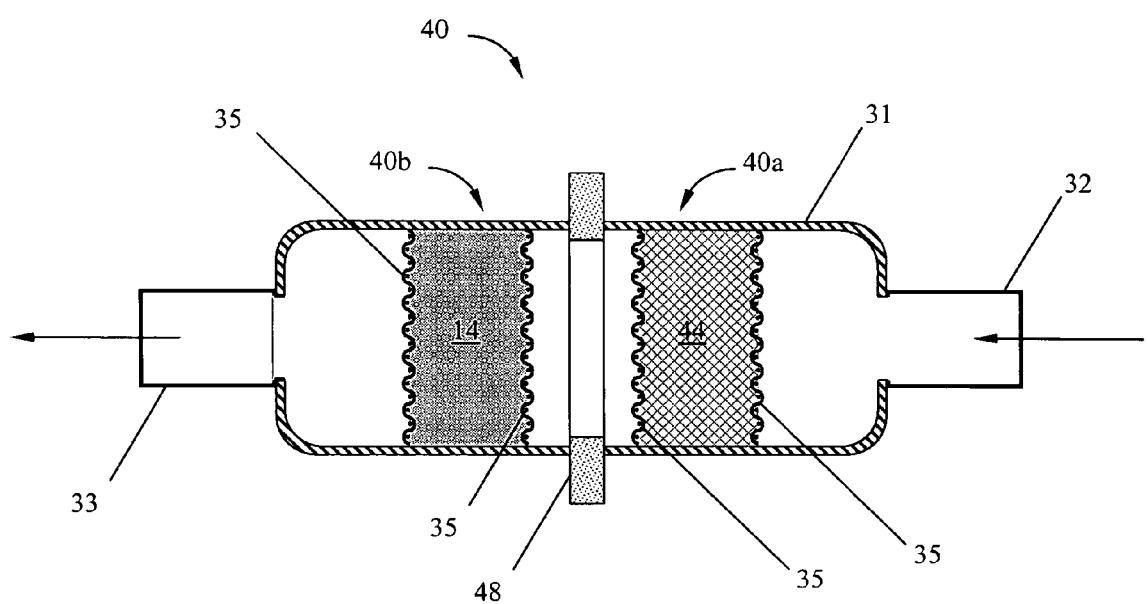
FIG. 4 illustrates a cut-away diagram of a simplified reactor containing multiple gas reaction zones, wherein a first zone may be used for drying the incoming gas, and successive zones for removing decreasing quantities of ammonia from a gas stream to passing through the reactor.

Lastly, the present process is sensitive to moisture since the materials used to getter ammonia are highly deliquescent. Thus, in some embodiments, such as those in which the incoming stream comprises a "wet" hydrogen stream, the gas could be first dried to remove residual moisture by contacting it with one or more of the oxides of various alkaline earth metals such as barium, calcium or strontium, known to react with water. In other embodiments, hydrogen gas may be contacted with a material such as zeolites, porous alumina and/or silica, and molecular sieves that physically adsorb water. In general, the drying agent and the getter material are intended to be physically separated particularly because the ammonia gettering agent is separately heated. Such an embodiment might be prepared as is illustrated in FIG. 4.

Again hydrogen gas indicated by an arrow entering through inlet 32 comes into contact first with drying material 48 and then with getter material 14. As before, device 40 is comprised of container 31, gas inlet 32 and gas outlet 33. Drying material 34 is placed in the chamber at a location adjacent to gas inlet 32, while getter material 14 is located at the opposite side of device 30 adjacent to gas outlet 33. Gas permeable mechanical barrier 35, again shown as a wire screen or gauze, physically separates the getter material and drying agent and both are contained within two separate but connected zones 40a and 40b. In addition, device 40 is further comprised of thermal barrier 48 separating zones 40a and 40b thereby allowing zone 40b to be separately heated (not shown), if necessary.

Finally, to the extent necessary to understand or complete the disclosure of the present invention, all publications, patents, and patent applications mentioned herein are expressly incorporated by reference therein to the same extent as though each were individually so incorporated.

Therefore, while the particular compositions described herein are fully capable of attaining the objects of the invention, it is to be understood that 1) these compositions are the embodiments of the invention and are thus representative of the subject matter which is broadly contemplated by the present invention; 2) the scope of the present invention is intended to encompass these and other embodiments which may become obvious to those skilled in the art; and 3) the scope of the present invention is accordingly to be limited by nothing other than the appended claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for". Lastly, all material quantities and amounts are in parts by weight or by weight percentages, unless otherwise indicated.

What is claimed is:

1. An apparatus for providing substantially ammonia-free hydrogen, comprising:
    a gas purification chamber comprising two or more gas permeable separation barriers, wherein the barriers are about parallel to each other and span a cross-section of the gas purification chamber and dividing the chamber into at least two interior zones and a gas inlet in fluid communication therewith through which a stream of hydrogen gas contaminated with trace amounts of ammonia may be introduced into the gas purification chamber;
    first and second getter compounds comprising cobalt nitrate and lithium hydride, wherein the hydrogen gas stream contacts the cobalt nitrate first and then contacts the lithium hydride, and wherein each of the first and second getter compounds is separately contained within one of the at least two interior zones of the gas purification chamber as a finely divided, loosely packed powder, the hydrogen gas passing through each of the loosely packed powders, wherein the first and second getter compounds chemically react with the small amounts of ammonia thereby removing the ammonia from the hydrogen gas; and
    a gas outlet in fluid communication with the gas purification chamber through which ammonia-free hydrogen gas can be released from the chamber.

2. The apparatus of claim 1, wherein the getter compound is co-mingled with the getter compound in the gas purification chamber.

3. The apparatus of claim 1, wherein the gas purification chamber further includes a drying compound.

4. The apparatus of claim 3, wherein the drying compound comprises either or both of a chemical getter or a physical getter.

5. The apparatus of claim 4, wherein the chemical getter comprises one or more alkaline earth oxide powders.

6. The apparatus of claim 4, wherein the physical getter comprises high surface area ceramic selected from the group consisting of zeolites, porous alumina, porous silica, activated carbon, and molecular sieves.

7. The apparatus of claim 5, wherein the alkaline earth oxides are selected from the group consisting of barium oxide, calcium oxide, strontium oxide, and combinations thereof.

8. The apparatus of claim 3, wherein the drying compound is a finely divided powder.

9. The apparatus of claim 8, wherein the drying compound is contained between two of the gas permeable barriers.

* * * * *